Patented June 10, 1947

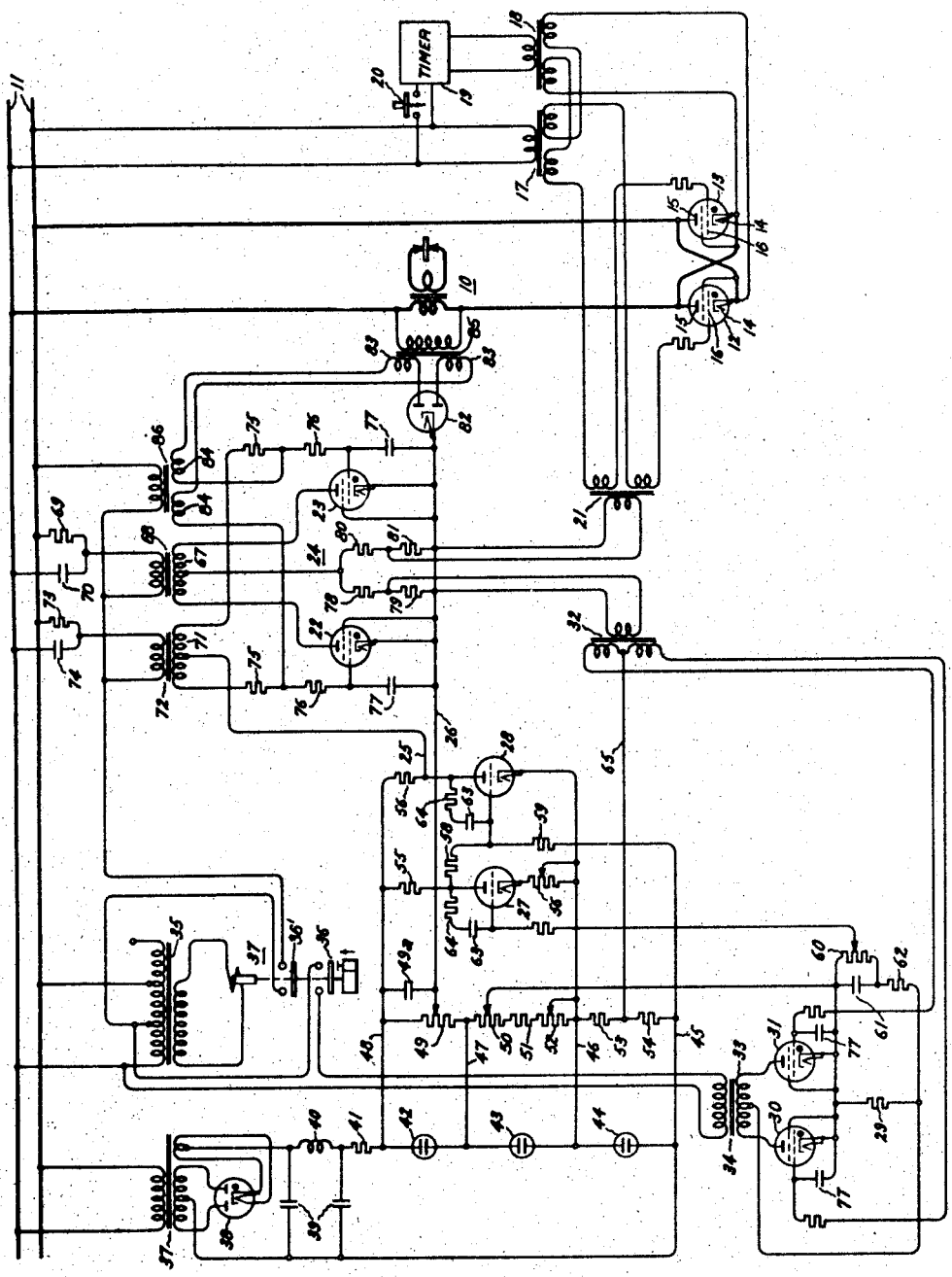

2,421,996

UNITED STATES PATENT OFFICE 2,421,996

ELECTRIC CONTROL CIRCUITS

Benjamin Cooper, Scotia, N. Y., assignor to General Electric Company, a corporation of New York Application November 7, 1944, Serial No. 562,301

5 Claims. (Cl. 171—119)

My invention relates to electric control circuits, and more particularly to improved control circuits adapted to control or regulate an electrical condition of an intermittently energized load circuit.

In industrial applications where timed applications of current to a load circuit are required, such as in resistance welding circuits, for example, it is essential that the heating value of the current supplied to the load during each interval of energization be maintained substantially constant. In many applications this may be accomplished to the degree required if the effect of the supply line voltage fluctuations is eliminated. Various circuits for accomplishing this have been proposed. In one form of such circuit an auxiliary load having the electrical characteristics of the welding load has been provided and has been continuously energized through a pair of reversely connected electric valves controlled by the same circuit as that controlling the electric valves through which the welding load is energized. The current supplied to the auxiliary load is the controlling variable used for energizing the control circuit. While this approach appears to be very satisfactory from a theoretical point of view, it has been found very difficult to adjust the characteristics of the auxiliary load and to maintain this adjustment in substantial correspondence with the characteristics of the welding load so that the expected degree of regulation of the welding current has not been realized. In accordance with the teachings of the present invention, I provide an improved control circuit including an auxiliary resistance and a regulating circuit including phase controlled rectifier valves for maintaining the average voltage across this resistance constant. I have found that the average voltage across a resistance supplied by phase controlled rectifier valves has a very similar characteristic to that of the root-mean-square current supplied to a lagging power factor load by reversely connected electric valves which are phase controlled to the same extent as the electric valves of the rectifier. By initiating conduction of the reversely connected electric valves at the same instant in the anode-cathode voltage thereof as the instant of initiation of conduction of the rectifier valves required for constant average voltage across the auxiliary resistance, the current supplied to the load is maintained substantially independent of supply line voltage fluctuations.

It is an object of my invention to provide a new and improved electric control circuit.

It is another object of my invention to provide a new and improved circuit for maintaining the current supplied to an intermittently energized load circuit substantially independent of supply voltage fluctuations.

It is still another object of my invention to provide a new and improved circuit for regulating an electrical condition of a lagging power factor load circuit which is easy to adjust initially and which maintains its adjustment in use.

In accordance with the illustrated embodiment of my invention, a resistance welding load is supplied with timed applications of welding current by means of a pair of reversely connected electric valve means each having a control member. The instant of initiation of conduction of the valve means is determined by the phase position of peaked voltages which are in turn controlled in accordance with supply line voltage fluctuations to maintain the current supplied to the welding load substantially independent of the supply line voltage fluctuations. The regulation of the phase of the peaked voltages is accomplished by applying to the reversely connected electric valves peaked voltages of the same phase position as those applied to the electric valves of an electric valve rectifier supplying a resistance load from the supply circuit. The variation in the phase of the peaked voltages is produced by a regulating circuit responsive to the average voltage of the resistance load.

A better understanding of my invention may be had by reference to the following description taken in connection with the accompanying drawing, and its scope will be pointed out in the appended claims. In the drawing, the single figure is a schematic representation of one embodiment of my invention.

Referring now to the drawing, I have shown my invention embodied in a system for supplying timed applications of current to a resistance welding transformer 10 from an alternating current supply circuit 11. The load current is controlled by a pair of electric valve means 12 and 13 which are reversely connected in parallel between the supply circuit and the welding transformer to transmit alternating current therebetween. As illustrated, the electric valve means 12 and 13 are of the type employing an ionizable medium, such as a gas or vapor, and each includes a cathode 14, an anode 15 and a control member 16. It will be understood that high current electric valves of the immersion-ignitor type may be employed, in which case the valves 12 and 13 may be employed as the firing valves for the ignitors. The control members 16 of the valves 12 and 13 are energized by three components of voltage. The first component of voltage is in phase opposition with the anode-cathode voltage of the electric valves and is supplied by the secondary windings of a transformer 17 having the primary winding thereof energized from the supply circuit 11. A second alternating component of voltage in phase with the anode-cathode voltages of the respective valves 12 and 13 is supplied by the secondary windings of a transformer 18, the primary winding of which is energized from the alternating current supply circuit 11 under the control of a timer 19 and an initiating switch 20. The component of voltage supplied by secondary windings of transformer 18 is not of sufficient magnitude to overcome the voltage of the transformer 17 so that conduction of valves 12 and 13 is determined by the combined action of the voltages of transformer 18 and the voltages of peaked wave form supplied by a saturable transformer 21 having secondary windings connected with each of the control members 16 of valves 12 and 13. Thus, the cycles during which the load circuit is energized are determined by the timer 19 and the time in each cycle at which conduction of valves 12 and 13 is initiated is determined by the phase position of the voltages produced by the transformer 21.

In accordance with my invention, an improved circuit is provided for regulating the phase position of the peaked voltages produced in the secondary windings of transformer 21 to maintain the current supplied to the welding load substantially independent of supply line voltage fluctuations. The phase position of the peaked voltages produced by winding 21 is controlled by controlling the instant of conduction of a pair of electric valves 22 and 23 of a phase shifting circuit illustrated generally by the numeral 24 which is, in turn, determined by the magnitude of the unidirectional voltage appearing between the conductors 25 and 26. The voltage between conductors 25 and 26 is the output voltage of a two-stage amplifier including electric valves 27 and 28 having the input voltage thereof determined by the average voltage appearing across a resistor 29 which is continuously energized from the alternating current supply circuit 11 through a bi-phase rectifier including electric valves 30 and 31. The phase position of the instant of initiation of conduction of electric valves 30 and 31 is the same as that of the main power valves 12 and 13 and is determined by the phase position of the voltages of peaked wave form produced in the secondary winding sections of a saturable transformer 32 which has the primary winding thereof energized from the same phase shifting circuit 24 as the transformer 21.

Referring now more particularly to the circuit for energizing the auxiliary load resistor 29, it will be noted that the electric valves 30 and 31 are energized from the secondary winding 33 of a transformer 34 having the primary winding energized from a portion of the voltage of the alternating current supply circuit 11 appearing across a pair of taps on the primary winding of a transformer 35. The circuit of primary winding of transformer 34 is completed through a contact 36 of a time delay relay 37 energized from the secondary winding of the transformer 35 to delay the energization of the transformer 33. The transformer 35 may to advantage be provided with a plurality of secondary windings (not shown) for supplying the heating current to the filaments of the electric valves of the system and the time delay of the relay 37 is adjusted to allow a proper interval for heating the filaments before completing the energizing circuit for transformer 34. The electric valves 30 and 31 are associated with the end terminals of the secondary winding 33 of transformer 34 and the cathodes thereof are connected together and to the midpoint of the winding 33 through the load resistor 29 to provide a controlled bi-phase electric valve rectifier circuit.

A source of direct current voltage for the two-stage amplifier including valves 27 and 28 may be provided by an electric valve rectifier including a transformer 37 and an electric discharge device 38. The direct current voltage is preferably filtered by parallel capacitors 39 and a series reactor 40. A resistor 41 and series connected voltage regulating valves 42, 43 and 44 provide regulated direct current voltages of different levels on conductors 45, 46, 47 and 48. Voltage dividing resistor 49 is connected between conductors 47 and 48, voltage dividing resistors 50, 51 and 52 are connected between conductors 46 and 47, and voltage dividing resistors 53 and 54 are connected between conductors 45 and 46. The anode-cathode circuits of amplifier valves 27 and 28 are energized from the voltage appearing between conductors 46 and 48. Thus the anode of valve 27 is connected with conductor 48 through a resistor 55, and the cathode is connected with conductor 46 through an adjustable resistor 56. The anode of valve 28 is connected through resistor 56 to conductor 48, and the cathode thereof is connected directly with conductor 46. The control member of electric valve 28 is energized in accordance with the conductivity of the valve 27 by virtue of its connection with intermediate resistors 58 and 59 which are connected in series between the anode of valve 27 and the conductor 45. The control member of valve 27 is energized in accordance with the average voltage across resistor 29. This energization is accomplished by the connection of the control member of valve 27 with an adjustable point on a resistor 60 which is connected across the terminals of a capacitor 61, the capacitor 61 being in turn connected in series with a resistor 62 and across the terminals of resistor 29. Capacitor 61 serves to average the voltage of resistor 29 and the adjustable resistor 60 to impress a desired portion of the average voltage on the control member of valve 27. The circuit to the cathode of valve 27 is completed through the portion of resistor 50 below the adjustable tap, resistors 51 and 52 and conductor 46. Since the tap on resistor 50 determines the output of the amplifier valves 27 and 28 for a given signal from the regulator including resistor 60, it provides a heat control adjustment. Each of the valves 27 and 28 is provided with a transient suppressing circuit including a capacitor 63 and a resistor 64 connected in series between its respective control electrode and anode. The cathodes of electric valves 30 and 31 are also connected with the adjustable point on the voltage dividing resistor 50 which therefore determines the voltage at which the cathodes of valves 30 and 31 are maintained. Since the control member circuit of valves 30 and 31 is completed from the common terminal of the voltage dividing resistors 53 and 54 through conductor 65 to the midtap of the secondary winding of transformer 32, this also determines the bias voltage on the control members of valves 31 and 32.

The electric valves 22 and 23 of the phase shifting circuit 24 have the cathodes thereof connected together and to the conductor 26, and the anodes thereof connected to the end terminals of a midtapped transformer secondary winding 67 of a transformer 68 having the primary winding thereof energized from the alternating current supply circuit 11 through a phase shifting bridge including the tapped primary winding of transformer 35 and a series connected resistor 69 and capacitor 70. The primary circuit of transformer 68 may include a contact of relay 37 to delay energization of the anode cathode circuit of valves 22 and 23 until the cathodes are at proper operating temperature. In a similar manner, the alternating current component of voltage for the control members of electric valves 22 and 23 is provided by the midtapped secondary winding 71 of a transformer 72 having the primary winding thereof energized from the supply circuit 11 from a second static phase shifting circuit including the mid-tapped primary winding of transformer 35 and a series connected resistor 73 and capacitor 74. The control members of electric valves 22 and 23 are connected, respectively, with the opposite end terminals of the secondary winding 71 of transformer 72 through resistors 75 and 76. Conductor 26 is maintained at a predetermined voltage level by its connection with voltage dividing resistor 49. A capacitor 49a may be connected between conductors 26 and 48 to assist in maintaining the voltage constant. Suitable transient suppressing capacitors 77 are connected between the control members and the cathodes of electric valves 22 and 23 as well as valves 30 and 31. The output circuit of the phase shifting network 24 is completed from the midtap of the transformer 67 to the common cathode conductor 26 and includes two parallel circuits each including two voltage dividing resistances in series. One of these circuits includes resistors 78 and 79 and the other resistors 80 and 81. The primary winding of the saturable peaking transformer 32 is energized from resistor 79, and the primary winding of peaking transformer 21 is energized from the voltage appearing across resistor 81. This static phase shifting circuit 24 is more fully described and claimed in the copending Bivens application, Serial No. 460,240, filed September 30, 1942, and assigned to the assignee of the present invention.

In order to limit the maximum angle of advance of the peaked voltages produced by transformers 21 and 32, I provide a circuit for impressing on the control members of valves 22 and 23 a voltage which varies in accordance with the voltage appearing across the anode-cathode circuits of the main electric valves 12 and 13. This voltage is impressed on the control members selectively by an electric discharge valve 82 having the cathode thereof connected with the cathode bus of electric valves 22 and 23, and having a pair of anodes connected, respectively, with the control members of valves 22 and 23 through windings 83 and 84 of transformers 85 and 86. Transformer 85 is energized in accordance with the voltage appearing across the welding transformer, and transformer 86 is energized in accordance with the voltage of the supply circuit. The difference of these voltages is in accordance with the voltage appearing across main electric valves 12 and 13 and provides an indication of the portion of the supply circuit voltage during which the main electric valves 12 and 13 are conductive. Through the operation of electric valve 82, this voltage is impressed on the control members to maintain electric valves 22 and 23 nonconducting until the instant corresponding to the power factor angle of the load circuit in the event that the voltage of the control member resulting from the bias of conductors 25 and 26 and winding 71 tends to advance the instant of initiation of conduction ahead of this point. This phase advancement limiter circuit is more fully described and claimed in my copending application, Serial No. 508,611, filed November 1, 1943.

The operation of the illustrated embodiment of my invention described above is as follows: When the alternating current supply circuit 11 is energized, transformer 35 is energized and at the expiration of a predetermined time the anode transformer 34 of electric valves 30 and 31 is energized. Direct current voltages are also impressed on the conductors 45, 46, 47 and 48. The auxiliary load resistor 29 is energized with a direct current voltage dependent upon the magnitude of the supply circuit voltage and the phase position of the auxiliary potentials supplied by the transformer 32. This voltage is averaged by the circuit including capacitor 61 and resistor 62, and a predetermined portion of this voltage is impressed on the circuit of amplifier valve 27 by the adjustable tap on resistor 60. This tap provides what may be called the full heat adjustment of the regulating system and should be re-adjusted when loads of different power factors are encountered. The voltage impressed on the control member of valve 27 establishes a predetermined conductivity of this valve which, in turn, establishes a predetermined conductivity of valve 28 and a resulting bias voltage appearing between conductors 25 and 26. This voltage is combined with the alternating current component of voltage of transformer secondary winding 71 to control the instant of initiation of conduction of electric valves 22 and 23, and in this way to control the phase position of the peaked voltages produced in the secondary windings of transformers 21 and 32. If the average voltage appearing across resistor 29 has a normal value for the setting of the slider on resistor 50, which is the heat control, the regulator is in a state of equilibrium. If now the supply line voltage increases, the voltage across resistor 29 increases, the voltage of resistor 60 impressed on control member of valve 27 becomes more negative, valve 27 conducts less, valve 28 conducts more, and the conductor 25 becomes more negative. This retards the instant of initiation of conduction of valves 22 and 23 and retards the phase position of the peaked voltage produced by the secondary windings of transformers 21 and 32 to restore the voltage of resistor 29 and to retard the phase of the peaked voltage impressed on control members of valves 12 and 13 so that the effect of increase in line voltage on the current supplied to the load is eliminated. When the voltage of the supply circuit decreases the reverse of the above action takes place and the phase of the peaked voltages supplied by transformer 32 is advanced sufficiently to maintain the average voltage of resistor 29 constant. The phase shifting circuit 24 effects the same change in phase of the peaked voltages produced by transformer 21 and applied to the control members of valves 12 and 13 as that required to maintain the average voltage of resistor 29 constant.

As indicated earlier in the specification, the fine regulating action accomplished by the circuit of the present invention results from the similarity of percentage change in the average voltage across a resistance supplied by a phase controlled rectifier and the percentage change in the root-mean-square current supplied to a lagging power factor load by reversely connected electric valves which are phase controlled to the same extent as the rectifier. For example, with a 60% lagging power factor load, full sine wave current is supplied to the load circuit when the initiation of conduction of the reversely connected electric valves is retarded 53°. At this same angle of retard, the average voltage across a resistor supplied by a phase controlled rectifier is 80% of the maximum average voltage produced when the rectifier is not phase controlled. If the angle of retard of the excitation voltages for both the rectifier and the reversely connected electric valves is increased to 80°, the root-mean-square current to the load circuit is reduced to 75% and the average voltage across the resistor is reduced to 73.8% of the value that it had at 53° retard. This example serves to show the very close similarity in the average voltage characteristic of the auxiliary continuously energized load circuit and the root-mean-square current characteristic of the load circuit. Similar examples could be given for load circuit power factors of 20% and 40% to show that the regulation continues to be very good for widely varying power factors and widely different heat settings of the welding circuit.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, means for transmitting timed applications of alternating current to said load circuit including electric valve means having a control member, a resistor, a rectifier including an electric valve interconnecting said supply circuit and said resistor for energizing said resistor continuously, said electric valve having a control member, a phase shifting circuit for energizing the control member of said electric valve means and the control member of said electric valve to control the instant of initiation of conduction of said electric valve means and said electric valve, means responsive to the average voltage of said resistor for controlling said phase shifting circuit to maintain the average voltage across said resistor substantially constant and to render the root-mean-square current supplied to said load circuit substantially independent of supply circuit voltage fluctuations.

2. In combination, an alternating current supply circuit, a load circuit, means for transmitting timed applications of alternating current to said load circuit including electric valve means having a control member, a resistor, a rectifier including an electric valve having a control member and interconnecting said supply circuit and said resistor for energizing said resistor continuously, means for energizing the control members of said electric valve means and said electric valve with a periodic voltage of the same periodicity as said supply circuit, means responsive to the average voltage of said resistor for shifting relative to the anode-cathode voltage of said electric valve the phase position of said periodic voltage applied to the control element thereof and thereby controlling the instant of initiation of conduction of said electric valve to maintain the average voltage of said resistor substantially constant, and means for effecting the same phase shift change of said periodic voltage applied to the control member of said electric valve means as that applied to the control member of said electric valve to maintain the current supplied to said load circuit substantially independent of supply circuit voltage fluctuations.

3. In combination, an alternating current supply circuit, a load circuit, means for transmitting timed applications of alternating current to said load circuit including electric valve means having a control member, a resistor, a rectifier of the bi-phase type including a pair of electric discharge paths and control members for controlling each of said paths, means connecting said rectifier for energization from said alternating current supply circuit and to energize said resistor continuously, a phase shifting circuit including an electric valve having a control member, means including a two-stage resistance coupled electronic amplifier having the input circuit energized in accordance with the average voltage across said resistor and the output circuit connected to energize the control member of the electric valve of said phase shifting circuit, and means for energizing the control members of the electric discharge paths of said rectifier and the control member of the electric valve means controlling the energization of said load circuit in accordance with the output voltage of said phase shifting circuit to maintain the average voltage across said resistor substantially constant and to maintain the current supplied to said load circuit independent of supply line voltage fluctuations.

4. In combination, an alternating current supply circuit, a load circuit, means for transmitting timed applications of alternating current to said load circuit including electric valve means having a control member, a resistor, a rectifier of the bi-phase type including a pair of electric discharge paths and control members for controlling each of said paths, means connecting said rectifier for energization from said alternating current supply circuit and to energize said resistor, a phase shifting circuit including an electric valve having a control member, means connected to energize the control member of the electric valve of said phase shifting circuit in accordance with the average voltage of said resistor, and means for energizing the control members of the electric discharge paths of said rectifier and the control member of the electric valve means controlling the energization of said load circuit in accordance with the output voltage of said phase shifting circuit to maintain the average voltage across said resistor substantially constant and to maintain the current supplied to said load circuit independent of supply line voltage fluctuations.

5. In combination, an alternating current supply circuit, a load circuit, means for transmitting timed applications of alternating current to said load circuit including electric valve means having a control member, a resistor, a rectifier including an electric discharge path and a control member for controlling said path, means connecting said rectifier for energization from said alternating current supply circuit and connected to energize said resistor continuously, means including a capacitor energized in accordance with the voltage of said resistor for producing a unidirectional control voltage proportional to the average output voltage of said rectifier, and means for energizing the control members of the electric discharge paths of said rectifier and the control member of the electric valve means controlling the energization of said load circuit in accordance with the output voltage of said phase shifting circuit to maintain the average voltage across said resistor substantially constant and to maintain the current supplied to said load circuit independent of supply line voltage fluctuations.

BENJAMIN COOPER.

REFERENCES CITED

The following references are of record in the file of this patent:

UNITED STATES PATENTS

| Number | Name | Date |
| --- | --- | --- |
| 2,374,044 | Smith | Apr. 17, 1945 |